Feb. 27, 1962 S. J. KOLNER 3,023,090
APPARATUS FOR CRYSTALLIZATION
Filed Feb. 28, 1955 2 Sheets-Sheet 1
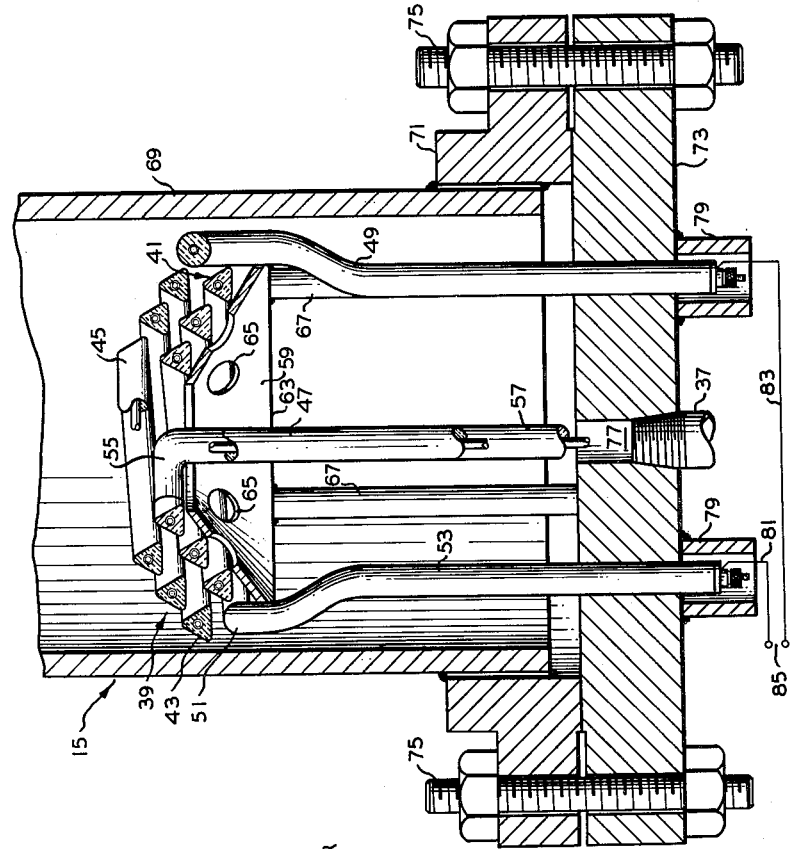
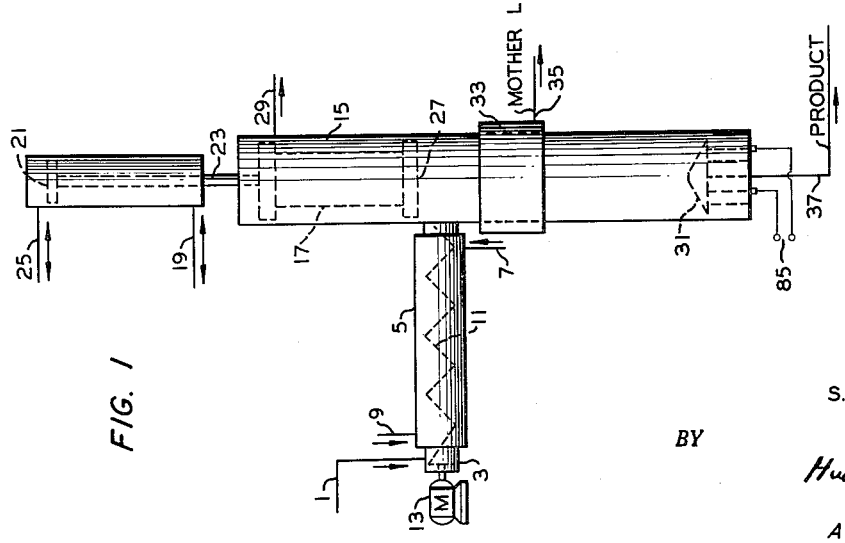
INVENTOR.
S.J. KOLNER
BY
Hudson & Young
ATTORNEYS Feb. 27, 1962     S. J. KOLNER     3,023,090

APPARATUS FOR CRYSTALLIZATION

Filed Feb. 28, 1955     2 Sheets-Sheet 2

INVENTOR.
S. J. KOLNER

BY

ATTORNEYS

United States Patent Office 3,023,090
Patented Feb. 27, 1962

3,023,090
APPARATUS FOR CRYSTALLIZATION
Samuel J. Kolner, Borger, Tex., assignor to Phillips Petroleum Company, a corporation of Delaware
Filed Feb. 28, 1955, Ser. No. 490,840
1 Claim. (Cl. 23—273)

This invention relates to separation by crystallization. In one of its aspects this invention relates to an improved apparatus for the separation of components of mixtures by fractional crystallization. In a more specific aspect, this invention relates to an improved heater for a crystal purification means.

Separations of compounds may be effected by distillation, solvent extraction and crystallization. Although distillation and extraction are generally preferred because of economy and convenience of operation, there are some instances in which such processes cannot be successfully utilized. Many chemical isomers have similar boiling points and solubilities and cannot be separated satisfactorily by distillation or extraction. Separation by means of fractional crystallization can be satisfactorily utilized in many cases in making such separations. Fractional crystallization has one great advantage over other methods of separation in that it is the only separation method which theoretically offers a pure product in a single stage of operation in systems in which the desired component of a mixture solidifies at temperatures above that at which the other components solidify. Thus, whereas distillation and extraction theoretically require infinite stages for a pure product, crystallization in many cases requires only one. This is because of the nature of the phase equilibria in distillation and extraction, while by crystallization, substantially pure crystals can be formed from many solutions in one stage, although the desired component may be of low concentration in the liquid feed.

Crystallization is thus well suited, not only to the separation of many chemical isomers which can be separated by no other means, but also to the purification of many compounds which cannot be economically purified by other means. Whereas one stage of crystallization theoretically offers a pure product, attainment of this ideal stage has been difficult. Complete removal of occluded impurities without substantial loss in yield is required. This invention results in a very close approach to the ideal crystallization stage.

In order to separate constituents of mixtures by fractional crystallization, it is necessary to adjust the temperature of the mixture to one which is below the temperature at which crystals form of any one of the pure constituents. For example, when para-xylene is separated from a mixture of isomeric $C_8$ alkyl benzenes, it is necessary to cool the mixture to a temperature in the neighborhood of about −57° to about −78° C. Generally, the desired constituent is relatively dilute in the liquid feed mixture and, upon such cooling, crystals and a substantial volume of mother liquor are formed.

Methods of separating a pure component from a mixture have been devised whereby the mixture to be separated is introduced into a heat exchange zone wherein a mixture of crystals and liquid is formed and that mixture is then introduced into an elongated purification chamber through which the crystals are moved as a compact mass. One such means for purifying crystals has been disclosed by J. Schmidt, Re. 23,810.

In the process disclosed by J. Schmidt, a mass of crystals is moved through an elongated chamber to a melting zone wherein the crystals are melted. A portion of liquid corresponding to the melt is caused to move countercurrently through at least a portion of the crystal mass so as to displace occluded impurities from the crystal mass approaching the melting zone. The exact mechanism whereby this displacing liquid corresponding to the melt improves the purity of the final product is not completely understood. However, it is presently believed that the substantially pure material which is refluxed through at least a portion of the crystal mass displaces occluded impurities in the interstices. At least a portion of the pure material is refrozen on the surface of the crystals. A high yield of product is obtained since the high melting product refreezes from the reflux stream as it comes in contact with the cold crystal mass moving toward the melting zone. Thus, the portion of the crystal mass which approaches the melting zone does not contain any appreciable amount of impurities and the resulting product which is removed from the melting zone is of extremely high purity.

Based upon the foregoing discussion of the process of J. Schmidt for separating a pure component from a mixture, it will be apparent that the efficiency of the heater in the melting zone of the crystal purification chamber is of the utmost importance. Particularly, the distribution of heat by the heater in the purification column has an important effect upon the stability of the purification column operation as well as its effectiveness to produce a high yield of the desired pure component. Prior to my invention, a system for separating para-xylene from a mixture of isomeric alkyl benzenes on a commercial scale was in operation wherein the heater in the purification column was a flat spiral electrical heater, commonly known as a "pancake" heater. The diameter of the pancake heater was equal to the inside diameter of the purification column and the pure para-xylene, upon being melted, flowed between the coils of the spiral heater and out the product outlet. In this system the average temperature in the melt zone, i.e. the liquid about the pancake heater and below it, was about 160° F. and the crystal mass approaching this melting zone had an average temperature of about −11° F. This was recognized to be a large temperature gradient and it is believed that this large temperature gradient was responsible for some of the problems encountered in maintaining stable operating conditions in the crystal purification column. For example, a highly undesirable occurrence in a fractional crystallization process is that "channeling" would occur and it is believed that the large temperature gradient existing in the old system was at least partly responsible for periodic occurrences of channeling. At will be understood by those skilled in the art, "channeling" is the effect observed when a portion of the crystal mass is unevenly melted so that less resistance is offered to the melt in the channel than is offered to the remainder of the countercurrently moving melt. The melt tends to move through the channel without displacing occluded impurities from the crystals to the extent needed in order to obtain a pure product. A need has existed for improving the system for separating a pure component from a mixture in fractional crystallization so as to provide more stable operations and, thereby, to increase the production rate of high purity product.

An object of this invention is, therefore, to provide an improved system for the separation of a pure component from liquid mixtures.

Another object is to provide an improved apparatus for the separation of a pure component from a mixture.

A further object is to provide an improved heater for a crystal purification means.

Other objects of the invention will be apparent to those skilled in the art upon study of the accompanying disclosure.

I have invented an improved heater for a crystal purification means which comprises a frusto-conical spiral heater. A plurality of such heaters can be used rested upon each other, and in a preferred embodiment of this invention two frusto-conical spiral heaters are used, one superposed on the other. An important feature of the heater of my invention resides in the relative sizes of the heater diameter and the inside diameter of the crystal purification means in which the heater is used. This feature is that the largest diameter of the base turn of the frusto-conical spiral heater is smaller than the inside diameter of the crystal purification means, which permits a portion of the crystal mass being moved therethrough to be extruded past the heater and to be melted in a zone of relatively hot melted product about the heater. Most importantly, the result of the use of the heater of my invention in a commercial operation for the separation of para-xylene from a mixture of isomeric alkyl benzenes is that the temperature of the zone of melted product about and around the heater is reduced by at least 30 percent and the product rate of high purity product is increased by about 24 percent.

Although this invention is particularly applicable to systems in which the temperature at which crystals of the desired pure component form is considerably higher than the temperature to which the component is cooled in the liquid mixture to form crystals thereof, the apparatus of my invention can be utilized advantageously in practically any system to which fractional crystallization is applicable so as to increase the efficiency of the process. This invention is applicable to the separations in many multicomponent systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say 15 to 25 percent purity, so as to effect a product purity upwards of 98 percent. In order to illustrate some of the systems to which the invention is applicable, the following compounds are grouped with respect to their boiling points.

| | B.P., °C. | F.P., °C. |
|---|---|---|
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 | |
| Methyl ethyl ketone | 79.6 | −86.4 |
| Methyl propionate | 79.9 | −87.5 |
| Methyl acrylate | 80.5 | |
| 1,3-cyclohexadiene | 80.5 | −98 |
| 2,4-dimethylpentane | 80.8 | −123.4 |
| 2,2,3-trimethylbutane | 80.9 | −25 |
| Cyclohexane | 81.4 | 6.5 |
| Acetonitrile | 82 | −42 |
| Cyclohexene | 83 | −103.7 |
| 2-methylhexane | 90 | −119 |
| 3-methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-trimethylpentane (isooctane) | 99.3 | −107.4 |
| Nitromethane | 101 | −29 |
| p-Dioxane | 101.5 | 11.7 |
| 2-pentanone | 101.7 | −77.8 |
| 2-methyl-2-butanol | 101.8 | −11.9 |
| 2,3-dimethylpentane | 89.4 | |
| 3-ethylpentane | 93.3 | −94.5 |
| Group C: | | |
| Toluene | 110.8 | −95 |
| Methylcyclohexane | 100.3 | −126.3 |
| 2,2,3,3-tetramethyl butane | 106.8 | 104 |
| 2,5-dimethylhexane | 108.25 | −91 |
| 2,4-dimethylhexane | 110 | |
| 2,3-dimethylhexane | 113.9 | |
| 3,4-dimethylhexane | 116.5 | |
| 3-ethyl-2-methylpentane | 114 | |
| 3-ethyl-3-methylpentane | 119 | |

| | B.P., °C. | F.P., °C. |
|---|---|---|
| Group D: | | |
| Aniline | 184.4 | −6.2 |
| Toluene | 110.8 | −95 |
| Benzene | 80.0 | 5.5 |
| Group E: | | |
| Carbon tetrachloride | 77 | −22.8 |
| Chloroform | 61 | −63.5 |
| CS₂ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| ortho-Cymene | 175.0 | −73.5 |
| meta-Cymene | 175.7 | <−25 |
| para-Cymene | 176.0 | −73.5 |

| | B.P., °C. | M.P., °C. |
|---|---|---|
| Group H: | | |
| Dimethyl phthalate | 282 | 5.5 |
| Dimethyl isophthalate | ¹124 | 67 |
| Dimethyl terephthalate | 288 | 140.6 |
| Group I: | | |
| ortho-Nitrotoluene | 222.3 | (α)−10.6 / (β)−4.1 |
| meta-Nitrotoluene | 231 | 15.5 |
| para-Nitrotoluene | 238 | 51.3 |

¹ 12 mm.

Systems consisting of any combination of two or more of the components within any one of the groups may be separated by the process of the invention, as well as systems made up of components selected from different groups; for example, benzene may be separated from a benzene-, n-hexane or n-heptane system in which the benzene is present in an amount greater than the eutectic concentration. In the same manner, para-xylene may be readily separated from a mixture of para- and meta-xylenes or from para-, meta-, and ortho-xylenes, or from a mixture of para-, meta-, and ortho-xylenes plus ethylbenzene and other compounds. Benzene may also be separated from a mixture of toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthaline, hydroquinone (1,4-benzenediol), paracresol, paradichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A more complete understanding of this invention will be obtained upon study of the accompanying drawings, in which:

FIGURE 1 is a schematic representation of a crystal purification system incorporating the heater of my invention;

FIGURE 4 is a view, partially in section, of an installation of the heater of my invention in a crystal purification column.

Figure 2:
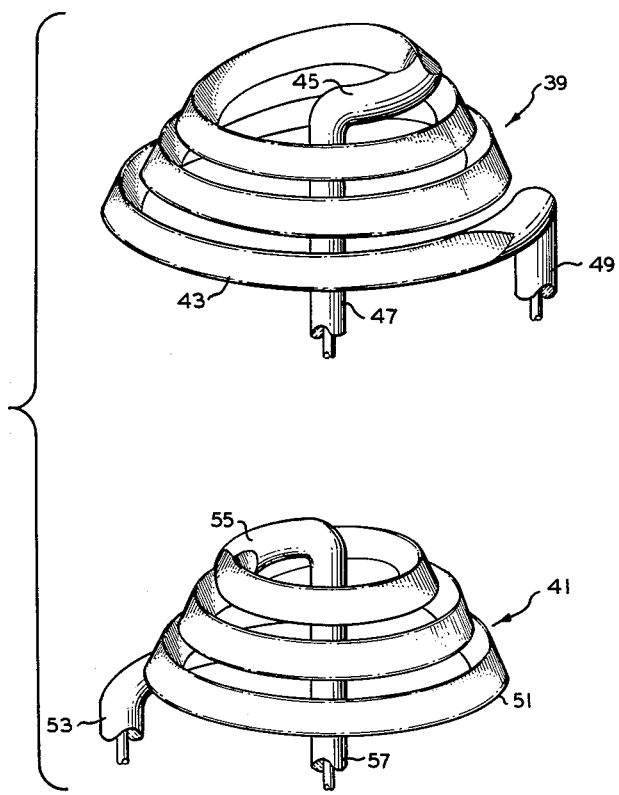
FIGURE 2 is a perspective view of a pair of the frusto-conical spiral heaters of my invention.

Referring now to FIGURE 1, a mixture of materials from which at least one constituent is to be separated is fed through a conduit 1 into a scraped surface chiller 3. Chiller 3 can be any conventional type chiller which is supplied with refrigeration means that are adequate to adjust the temperature of the mixture to that necessary to obtain crystals of at least a portion of at least one of the constituents thereof. Thus, chiller 3 is provided with a jacket 5 having an inlet 7 and an outlet 9 through which a heat exchange fluid can be passed. Chiller 3 also comprises a rotatable scraper blade 11 which is rotated by a motor 13. As will be apparent from the discussion hereinabove, the temperature to which the mixture is adjusted in chiller 3 depends entirely upon the feed mixture, since the various materials in the feed have different solidification points and since the solidification point of any given constituent of the feed mixture is dependent upon the composition of the feed mixture. When, for example, a mixture of isomeric $C_8$ alkyl benzenes is fed through conduit 1 to chiller 3, the temperature of that mixture is lowered to a temperature in the neighborhood of $-57$ to $-78°$ C. When the desired component of the feed mixture is relatively dilute in the feed mixture, the temperature at which crystals will form will be relatively low. If the desired constituent is relatively concentrated in the feed, the temperature at which crystals will form will be relatively high. As is shown in FIGURE 1, the resulting slurry of crystals is passed directly to a crystal purification column 15. In the commercial operation referred to hereinbefore, the feed mixture, prior to entering the crystal puification column, is passed through a series of chillers and filters in order to concentrate the desired component in the feed mixture. Since this phase of the system is not directly concerned with the present invention, the drawing in FIGURE 1 has been simplified by eliminating the steps and apparatus required to carry out the concentration of the desired component as is actually done. The crystals formed in chiller 3 are moved into column 15 by hydraulic forces produced by the pump, not shown, which passes the feed mixture through conduit 1 and chiller 3. The crystals in column 15 are moved as an elongated crystal mass downwardly by a piston 17. Piston 17 is withdrawn by means of fluid flow through a conduit 19 and acting against a piston 21, which is connected to piston 17 by a piston rod 23. Piston 17 is moved in a downstream direction by flow of fluid through a conduit 25 and against piston 21. Piston 17 also comprises a porous face 27 which permits the passage therethrough of liquid from the crystal mass as it is compacted and out of column 15 via a conduit 29.

My invention is not restricted to crystal purification systems wherein the crystal mass is advanced through a crystal purification chamber by a piston which is positioned at the upstream end portion of the chamber, but is useful in any purification system wherein the crystal mass is advanced towards a heater by some means in order that a reflux liquid is caused to move countercurrently through at least a portion of the crystal mass so as to displace occluded impurities from the crystal mass approaching the melting zone. In this connection, reference is made to the copending application of E. E. Rush, Serial No. 375,516, filed August 20, 1953, now Patent No. 2,910,516, for a crystal purification system wherein the crystal mass is moved through a purification chamber by a combination of gravity and hydraulic forces, and to the copending application of R. W. Thomas, Serial No. 494,866, filed March 17, 1955, now Patent No. 2,854,494, wherein the crystal mass can be moved through a purification chamber by hydraulic forces.

In this manner, the crystals are moved downwardly through column 15 to a melting zone in the lower end thereof to come into heat exchange relationship with a heater 31 which is constructed in accordance with the present invention. A portion of the melt thus produced is displaced countercurrently to the movement of the crystals and through a portion of the crystal mass so as to displace impurities from the crystal mass. The impurities which are displaced from the crystal mass are removed through a filter 33 and a conduit 35. Under some conditions of operation, the concentration of material corresponding to the purified material in the stream removed through conduit 35 is higher than its concentration in the feed mixture introduced via conduit 1 to chiller 3. In this event, the stream in conduit 35 can be passed by a conduit, not shown, back to chiller 3 wherein it is used to enrich the feed mixture. This results in formation of larger crystals than can be formed from a feed mixture containing a lower concentration of the desired component. If the concentration of the desired component in the stream removed via conduit 35 is relatively low, that stream may be disposed of as is desired. Purified product is removed from column 15 through a conduit 37.

Referring now to FIGURE 2, a better understanding of the heater of my invention will be had by observing the shape and construction of the heater shown therein. As was pointed out before, a preferred embodiment of this invention resides in the use of a pair of frusto-conical spiral heaters, one superposed on the other. Two heaters indicated generally as 39 and 41 are shown in the position they assume when installed in a crystal purification column. The heaters are shown as being separated, one spaced above the other, in order to illustrate more clearly the shape of the heaters themselves. However, the heaters are intended to be used by placing one directly upon the other, i.e., by lowering heater 39 so that it rests upon heater 41. It will be further noted that heaters 39 and 41 are identically constructed and that heater 41 has been rotated in the drawing by 180° from the position in which heater 39 is shown. The frusto-conical spiral heater of my invention is a heater constructed by shaping a heating element into a spiral with the generating point of the spiral being axially displaced by an amount which is proportional to the angular rotation of the generating point. The axial displacement of the generating point is interrupted before the generating point concides with the center or axis of the spiral thus forming a frusto-conical spiral. As is shown in FIGURE 2, heater 39 has a base turn 43 which ascends the frusto-conical spiral to a top turn 45 thereof. Top turn 45 is abruptly bent in a downwardly direction in the middle of the spiral to form a center leg 47 which extends to a source of heat. Base turn 43 is abruptly bent downwardly at the side of the heater to form a side leg 49 which also extends to the source of heat. Similarly, heater 41 comprises a base turn 51 which is abruptly bent downwardly at the side of the heater to form a side leg 53. The base turn 51 ascends in the spiral to a top turn 55 of the heater which is abruptly bent downwardly in the center of the heater to form a center leg 57.

It will be noted from the drawings, particularly FIGURE 2, that the heater of my invention comprises a tubular element having the shape of a frusto-conical spiral. The preferred embodiment of my invention is a heater formed of a Chromalox tubular element, type T, which is manufactured by Edwin L. Wiegand Company, Pittsburgh, Pennsylvania. The Chromalox tubular element has a triangular cross section with nearly flat sides with the exception of a few inches at each end which has a round cross section. The Chromalox element comprises a helical coil of nickel chromium resistance wire embedded in refractory material, such as asbestos, and which is encased in a metal tube. The tube is subjected to hydraulic pressure to reduce the cross section of the tubular element to the triangular shape. In the commercial operation for the separation of para-xylene from a mixture of isomeric $C_8$ alkyl benzenes referred to hereinabove, a pair of heaters, such as are illustrated in FIGURE 2, have been in use for several months. These heaters are formed from Chromalox tubular elements, identified as TC-8545 in Industrial Catalog 50, reprinted April 1952, of Edwin L. Wiegand Company. The metal sheath for the tubular element is formed of copper and each heater operates on 230 volts.

Obviously, other tubular heating elements are available commercially which would be equivalent to that described above. My invention resides in the specific shape of the heater and its remarkable advantages when used in a crystal purification means. Although electrical heating elements are preferred, hollow tubular heating elements can also be used, when formed in a frusto-conical spiral, and through which a heat exchange fluid is passed. Thus, such well known heat exchange fluids such as steam, methanol, or Dowtherm can be passed through a hollow tube formed in the shape of the heater of my invention and the advantages of my invention will be obtained.

Figure 3:
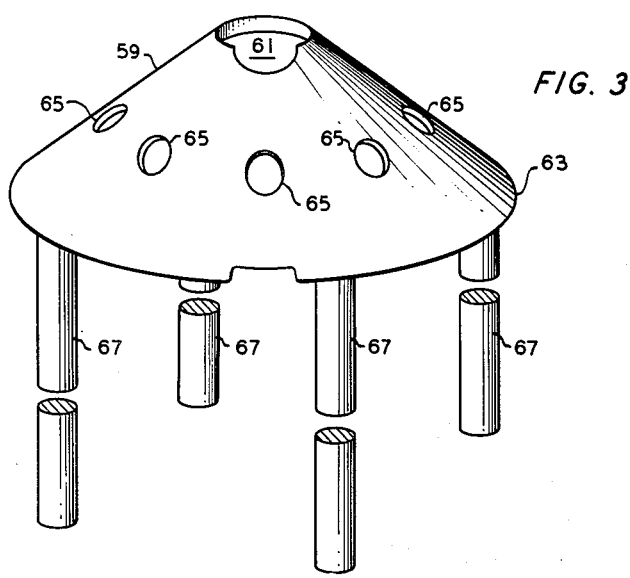
FIGURE 3 is a perspective view of a hollow frusto-conical heater support plate used to support the heater of my invention.

Referring now to FIGURE 3, a specific heater support plate is shown which is designed to be used in conjunction with the heater of my invention. Thus, there is shown a hollow frusto-conical heater support plate 59. Plate 59 carries the heater of my invention superposed upon it. When a pair of heaters are used, such as heaters 39 and 41 shown in FIGURE 2, the center legs 47 and 57 thereof pass downwardly through an opening 61 at the apex of the plate and the side legs 49 and 53 thereof return to a source of heat at the side of the base 63 of the plate. Plate 59 also comprises a plurality of perforations 65 which are preferably equally spaced from each other and generally intermediate to apex 61 and base 63 of plate 59. Perforations 65 permit melted product to pass therethrough to the melt zone of the purification column. Plate 59 is supported by four upright support rods 67. One end of each of rods 67 is securely attached with about equal spacing therebetween to base 63 of plate 59. As will be apparent from the following discussion of FIGURE 4, rods 67 are attached at their opposite ends to the inside of the lower end of column 15.

Referring now to FIGURE 4, there is shown a view, partially in section, of an installation of heaters 39 and 41 and support plate 59 in column 15. Column 15 comprises a closed cylindrical chamber 69 having lower flange 71 welded thereto. The bottom end of column 15 is closed by a base plate 73 which is fastened to flange 71 by a plurality of bolts 75. A central perforation 77 in plate 73 affords a product outlet for column 15 and conduit 37, see FIGURE 1, is threaded into outlet 77 to transport product therefrom. It will be observed from FIGURE 4, that frusto-conical spiral heater 39 is superposed on heater 41 which is superposed on plate 59. It will be observed further that the diameter of base turn 51 of heater 41 and of base turn 43 of heater 39 as well as the diameter of base 63 of plate 59 all are smaller than the inside diameter of column 15. In the commercial operation referred to hereinabove, wherein a pair of heaters have been in use for several months, the space between the inside wall of the purification column and the outside of the base of the heaters is about three-fourths of an inch. The tubular heating element from which the heaters are formed is one-half inch material. In a preferred aspect, the largest diameter of the heater is spaced from the inner wall of the purification means by a distance which is about equal to at least one-third of an inch.

Plate 59 is supported within column 15 by four support rods 67 which are rigidly attached at their lower ends to plate 73 and at their upper ends to the lower edge of plate 59.

As is shown in FIGURE 4, side legs 49 and 53 extend downwardly through plate 73 to a pair of receptacles 79 in which they are connected to a source of heat. In the embodiment shown, heaters 39 and 41 are electrical heaters. Thus side legs 49 and 53 are connected by a pair of leads 81 and 83 to a source of power 85 for supplying energy to the heaters. Where a hollow heating element is used, the side legs 49 and 53 are connected to a source of heat exchange fluid, not shown, so that the hot fluid can be passed through the heater. Center legs 47 and 57 also extend downwardly through plate 73 to a pair of receptacles, not shown, to clarify the drawing, where they are similarly connected to the source of energy 85.

In order to illustrate my invention more completely, and particularly in order to point out the remarkable advantages in operation of a crystal purification system wherein my invention is incorporated, I have provided the following example which is intended to exemplify the invention but not to unduly restrict it.

*Example*

A commercial scale operation for separating relatively pure para-xylene from a mixture of isomeric $C_8$ alkyl benzenes, which incorporates a pair of heaters in accordance with this invention, has been in operation for several months. Before the installation of the heaters of my invention, a flat spiral or "pancake" heater was used. The average production rate of 98.4 weight percent para-xylene in gallons per hour during a representative six consecutive week period in which the old pancake-type heater was used was 25 gallons per hour. The average temperature of the melt zone, i.e., the temperature of liquid about and below the pancake heater, during this period was 160° F.

The average production rate of 98.4 weight percent para-xylene after the installation of a pair of heaters constructed in accordance with this invention based on a representative six consecutive week period was 31 gallons per hour. The temperature of the melt zone during this period was reduced to 110° F. There were no material changes in the other equipment used in this system the purification column for both six weeks' periods was substantially the same. The feed composition entering the purification column for both six weeks periods was about 50 percent solids and contained 62 weight percent para-xylene, 14.4 weight percent meta-xylene, 14.3 weight percent ethyl benzene, 8 weight percent ortho-xylene, 1 weight percent toluene and 0.3 weight percent of other materials. The heaters of my invention are presently in use in the commercial operation mentioned above and the increased rate of production of high purity para-xylene is continuing. I believe that this is largely due to the fact that more stable operation of the purification column has been achieved and that the more stable operation is due to the improved distribution of heat to the crystal mass as it contacts the heaters of my invention. The heaters of this invention are believed to aid in preventing channeling of impure liquid through the crystal mass which upsets the operation of the purification column. In any event, the consistent increase in production rate, as shown by the data obtained from six weeks' consecutive operation set forth above is believed to demonstrate clearly that the improved operation is due to the heaters which have been installed in accordance with my invention.

It will be apparent to those skilled in the art that modications of this invention can be made upon study of the accompanying disclosure which will be clearly within the spirit and scope of this invention.

I claim:

An apparatus for separation by crystallization comprising, in combination, an upright elongated cylindrical closed chamber, piston means in the upper portion of said chamber for moving crystals as a compact mass through said chamber, a hollow frusto-conical heater support plate in the lower portion of said chamber, said plate being positioned with its apex upright and having a plurality of spaced perforations positioned around said plate and generally intermediate the apex and base edges of said plate, a plurality of upright support rods in said chamber, one end of each rod being attached to the lower end of said chamber and the other end of each rod being attached with about equal spacing therebetween to the base of said plate, a pair of frusto-conical spiral heaters in said chamber, one of said heaters being superposed on said plate and the other of said heaters being superposed on the first-mentioned heater, the outer base edge of said hollow frusto-conical plate and the outer edge of the base turn of said frusto-conical spiral heaters being spaced by a distance about equal to at least one-third of an inch from the inner wall of said chamber, and means in the lower end of said chamber, down-stream of said heaters, for removing purified product from said chamber.

References Cited in the file of this patent

UNITED STATES PATENTS

| | | |
|---|---|---|
| 451,546 | Wildman | May 5, 1891 |
| 482,694 | Palson | Sept. 13, 1892 |
| 2,035,441 | Allen et al. | Mar. 31, 1936 |
| 2,361,874 | Russell | Oct. 31, 1944 |
| 2,617,274 | Schmidt | Nov. 11, 1952 |
| 2,683,178 | Findlay | July 6, 1954 |
| 2,686,864 | Wroughton et al. | Aug. 17, 1954 |
| 2,709,215 | Miller | May 24, 1955 |
| 2,765,921 | Green | Oct. 9, 1956 |

FOREIGN PATENTS

| | | |
|---|---|---|
| 363,774 | Great Britain | Dec. 31, 1931 |